Figures 1, 2:
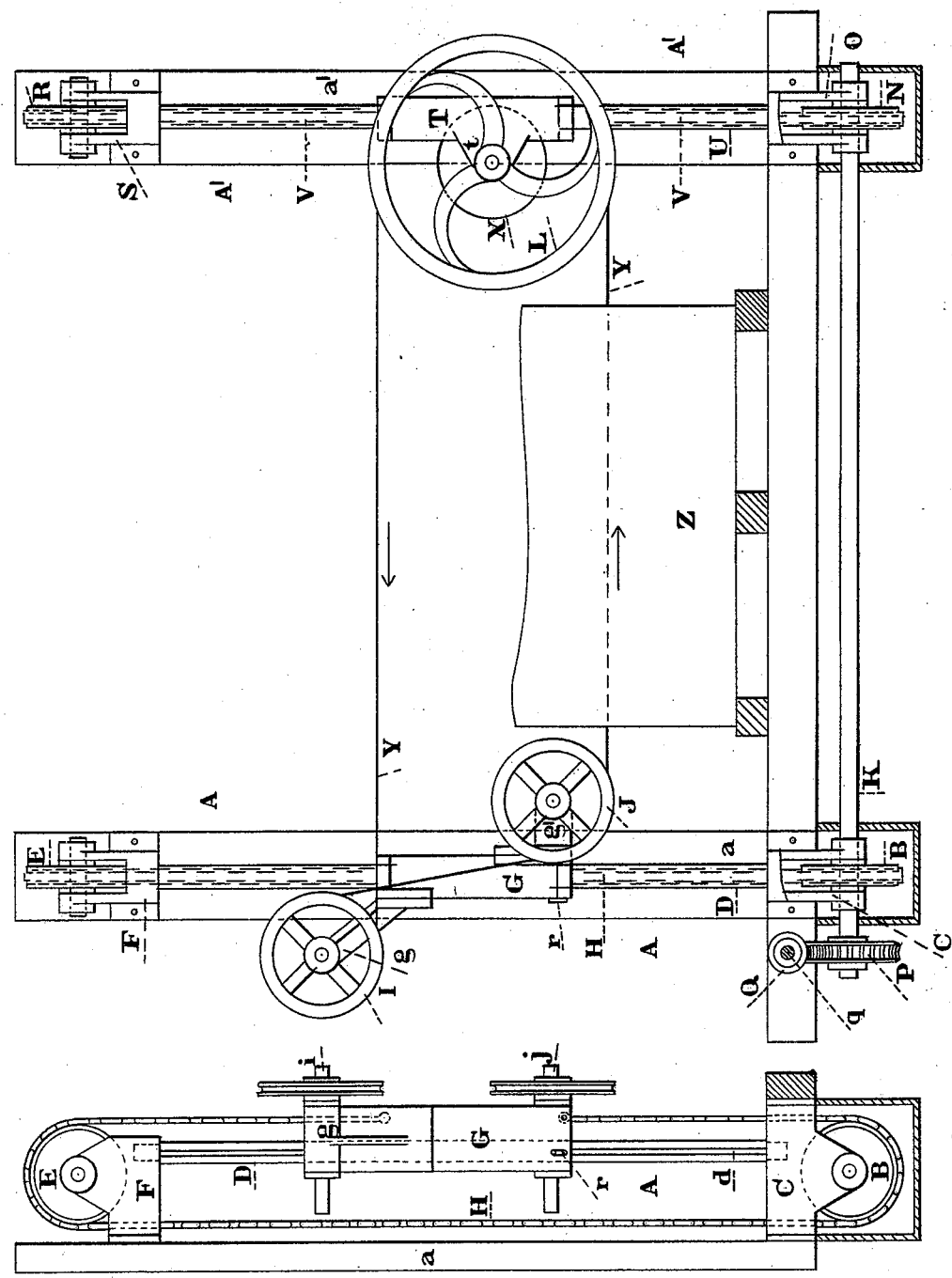

(No Model.) 2 Sheets—Sheet 1.

W. P. BARCLAY.
STONE SAWING MACHINE.

No. 497,400. Patented May 16, 1893.

Witnesses
Thomas F. Doyle.
William T. Pagels.

Inventor
W. P. Barclay

THE NORRIS PETERS CO., PHOTO-LITHO., WASHINGTON, D. C.

(No Model.) 2 Sheets—Sheet 2.
W. P. BARCLAY.
STONE SAWING MACHINE.
No. 497,400. Patented May 16, 1893.
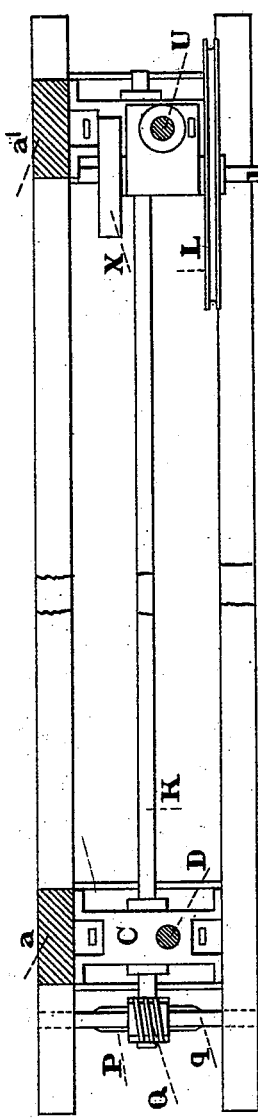
Fig. 3
Fig. 4
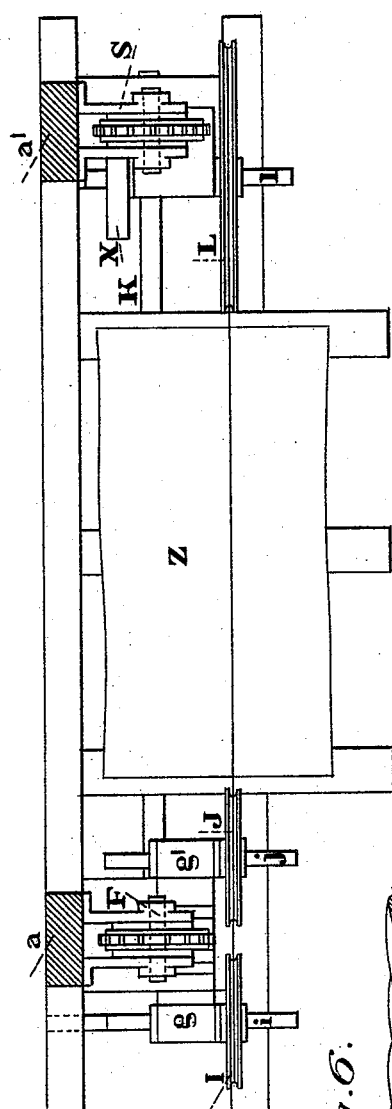
Fig. 5
Fig. 6
Witnesses
Thomas F. Doyle.
William F. Pagels.
Inventor
W. P. Barclay

UNITED STATES PATENT OFFICE.

WILLIAM PARIS BARCLAY, OF CHICAGO, ILLINOIS, ASSIGNOR OF ONE-HALF TO WILLIAM F. PAGELS.

STONE-SAWING MACHINE.

SPECIFICATION forming part of Letters Patent No. 497,400, dated May 16, 1893.

Application filed September 5, 1890. Serial No. 364,049. (No model.)

*To all whom it may concern:*

Be it known that I, WILLIAM PARIS BARCLAY, a citizen of the United States, residing at Chicago, in the county of Cook and State of Illinois, have invented a new and useful Stone-Sawing Machine, of which the following is a specification.

This invention relates to that class of stone sawing machines, in which an endless wire saw blade is used, and my improvements consist in a novel arrangement for lowering or raising the endless wire saw blade, and pulleys, with their adjacent supporting sleeves. I attain the desired object by the machine illustrated in the accompanying drawings, in which—

Figure 1, shows a front elevation of the machine. Fig. 2, shows an end elevation of the frame, that carries the smaller saw blade pulleys. Fig. 3, is a plan view of the lower bracket that supports the link chain pulley; the screw, and screw wheel, for operating chain pulleys are also represented in this view. Fig. 4, is a plan view of the sleeve that supports the larger saw blade pulley, and the belt pulley, by which motion is communicated to the wire saw blade Y, that is carried from the grooved pulleys supported from the spindles of loose sleeves. Fig. 5, is a general plan view of the machine. Fig. 6 is a section of the saw blade.

Similar letters of reference refer to similar parts.

At the lower end of frame A, is a chain or link-belt pulley B, the spindle of which takes into a bracket C, that is attached to the frame-post a. The bracket C, also secures the lower end of the guide bar D.

At the upper end of frame A, is a chain or link-belt pulley E, the spindle of which takes into a bracket F, that is attached to the frame post a. The bracket F, also secures the upper end of the guide bar D. The guide bar D, is held in a vertical position by the brackets C, F, and said guide bar has a groove d, cut in it, its entire length. The loose sleeve G, takes onto the guide bar D, said sleeve being connected to the ends of a link chain H, that takes onto the upper and lower chain pulleys, said pulleys being commonly known as sprocket wheels. The loose sleeve G, is prevented from turning around upon the guide bar D, by a feather or key r that projects from the bore of loose sleeve G, and takes into the groove d, formed in the guide bar D. The loose sleeve G, carries two grooved pulleys I, J, that are attached to the spindles i, j, that take into the boxes g, g', formed upon the loose sleeve G. The said spindles are made to revolve in their boxes, and the pulleys I, J, revolve with their spindles. The link-chain H, is firmly secured at each end to the loose-sleeve G, and as the link-chain moves, the loose-sleeve also moves correspondingly upon the guide bar D. The spindle or shaft K, of lower link-chain pulley B, is extended to the frame A', that supports the larger saw-blade pulley L, and the said spindle or shaft K, takes into the lower link-chain pulley N, of the bracket O, of frame A'. The spindle or shaft K, has also secured to it a screw wheel P, into which meshes a screw Q, supported from a spindle q, that is secured to the frame work of machine.

The frame A', is similar in construction to the frame A, having link chain pulleys N, R, and brackets O, S, at the upper and lower ends of said frame.

The loose sleeve T, of frame A', carries a large grooved pulley L, for the wire saw blade Y, and an ordinary belt pulley X, both of said pulleys being attached to the same spindle l, and which takes into the box t, formed upon the loose sleeve T. The loose sleeve T, is prevented from turning around on its guide bar U, by a projecting feather or key that takes into a groove u formed in the guide bar U, for its entire length. The link chain V, is firmly secured at each end to the loose sleeve T, and as the link chain moves, the loose sleeve T, also moves correspondingly upon its guide-bar U. The wire saw blade Y, passes over the several grooved pulleys as shown in Fig. 1, and necessarily rises or falls with the said grooved pulleys, as the loose sleeves G, T, upon the guide bars D, U, rise or fall; the link chains H, V, operating the loose sleeves G, T, simultaneously, that the said sleeves move up and down together. The screw wheel P, is operated by the screw Q, that meshes into it, and the said screw is turned around by its spindle q, to revolve the screw wheel P, and its shaft K, and through said shaft the lower link-chain pulleys B, N, which give motion to the link-chains H, V, and from which the loose sleves G, T, carrying the several grooved pulleys are suspended.

The flexible saw blade Y, is preferably composed of three steel wires twisted together, and the saw blade is made endless. The flexible saw blade travels continuously in the direction shown by the arrows, and in addition to the longitudinal travel which is given to the saw blade, it also has a slow rotating motion around its longitudinal axis. The saw blade Y, takes onto the under side of pulley I, and passes nearly around the said pulley, and the saw blade consequently receives an elastic set, the same as a spring, and as the saw-blade takes on to the pulley J, this elastic set already given produces sufficient resistance so that instead of the saw blade taking on to the pulley J, in such a manner that the saw blade should not have a gyratory motion, it becomes in fact the resistance that causes the saw blade to have such gyratory motion. The saw blade yielding to the lesser resistance consequently has a gyratory motion given to it, as it travels in a linear direction, and the amount of the gyratory motion between the pulleys J, and L, is regulated by the distance between the pulleys I, J.

The gyratory motion of the saw blade Y, is important as by it the sand which is the true agent of the disaggregation at the saw cut of the stone is swept underneath the saw blade, and drawn the whole length of the cut by the linear travel of the saw blade.

The sawing operation as in other stone sawing machines has a continuous jet of sand and water, which falls at one end of the saw cut.

The operation of the machine is as follows: The stone Z, is so placed that the line of division where the stone is to be cut is directly beneath the part of saw blade between the pulleys J, L. The driving pulley X, is then given a revolving motion by being connected by belt or otherwise to a suitable motor. The spindle $q$, of screw Q, is also given a revolving motion by a belt or otherwise to operate the screw wheel P, and the several link-chain wheels and link-chains in connection therewith. The saw blade Y, is then allowed to descend gradually and as it travels forward it is the means of conveying the sand and water across the surface of the stone that a cut or groove is immediately formed in the stone, and as the saw blade is made to descend gradually according to the hardness of the stone, and the sand and water being drawn along always at the same vertical position across the face of stone, the sand and water as gradually cut and disaggregate the rock or stone situated as shown, upon the machine.

Having described the several parts and operation of the machine, what I claim is as follows:

1. In a spiral wire stone sawing machine the frame A, consisting of the bracket C, carrying the sprocket wheel B, the post $a$, and bracket F carrying the sprocket wheel E, the grooved guide bar D, connecting said brackets, the sleeve G reciprocating on said bar, the sprocket chain H, attached at each end to the sleeve G, and passing around the wheels B, and E, and the shafts $i, j$, mounted in boxes on the sleeve G, all substantially as shown and described.

2. In a spiral wire stone sawing machine, the frame A', consisting of the bracket O, carrying the sprocket wheel N, the post $a'$, and the bracket S, carrying the sprocket wheel R, the guide bar U, connecting the said brackets, the sleeve T, reciprocating on the bar U, the chain V, connected at each end to the sleeve T, and passing around the wheels N and R, and the shaft $l$, journaled in boxes $t$, on the sleeve T, all substantially as described and shown.

3. In a spiral wire stone sawing machine, the combination of the shafts $i, j, l$, pulleys I, J, L, and the saw blade Y, leading from top of pulley L, to the bottom of pulley I, and thence around the said pulley to the pulleys J, L, in such a manner as to produce an axial rotation of the saw, all substantially as shown and described.

WILLIAM PARIS BARCLAY.

Witnesses:
 THOMAS F. DOYLE,
 WILLIAM F. PAGELS.